United States Patent [19]

Dunn et al.

[11] 4,420,838

[45] Dec. 13, 1983

[54] ELECTRODE REPLACEMENT APPARATUS

[75] Inventors: Charles S. Dunn, Pataskala; Stephen Seng, Bladensburg, both of Ohio

[73] Assignee: Owens-Corning Fiberglas Corporation, Toledo, Ohio

[21] Appl. No.: 342,672

[22] Filed: Jan. 26, 1982

[51] Int. Cl.³ .............................................. H05B 7/14
[52] U.S. Cl. .................................................... 373/92
[58] Field of Search ................... 373/91, 92, 100, 101; 285/36, 421, 31, 18, 390

[56] References Cited

U.S. PATENT DOCUMENTS

| | | |
|---|---|---|
| 2,458,272 | 7/1946 | Jones . |
| 2,907,806 | 10/1959 | Rossin, Jr. et al. .................... 373/91 |
| 2,911,455 | 11/1959 | Olsson et al. ........................ 373/100 |
| 4,185,158 | 1/1980 | Koga et al. . |

Primary Examiner—Roy N. Envall, Jr
Attorney, Agent, or Firm—Ronald C. Hudgens; Patrick P. Pacella

[57] ABSTRACT

An apparatus for replenishing electrodes in an arc furnace or the like. The apparatus threadedly attaches a replenishment electrode section to a previously installed, presently working electrode section without interrupting the operation of the furnace. The electrode sections are provided with mating terminal threaded portions which are engaged by simultaneousy lowering and rotating the replenishment electrode section. By lowering the replenishment electrode at a faster rate than the lead of the electrode threads and accommodating relative vertical movement of the electrodes, it is not necessary to precisely match the lowering speed of the replenishment electrode with the threads of the electrode. A novel screw-driven, electrically insulated, telescopic drive train is employed for this purpose. The replenishment electrode is carried by a plurality of peripherally spaced wedges actuated independently of the drive train to retain and release the electrode. The telescopic drive train may incorporate either a universal joint in combination with a telescopic connection or reversely wound helical springs which both rotate the electrode and compress to permit the replenishment electrode section to move relatively upwardly during threading.

14 Claims, 13 Drawing Figures

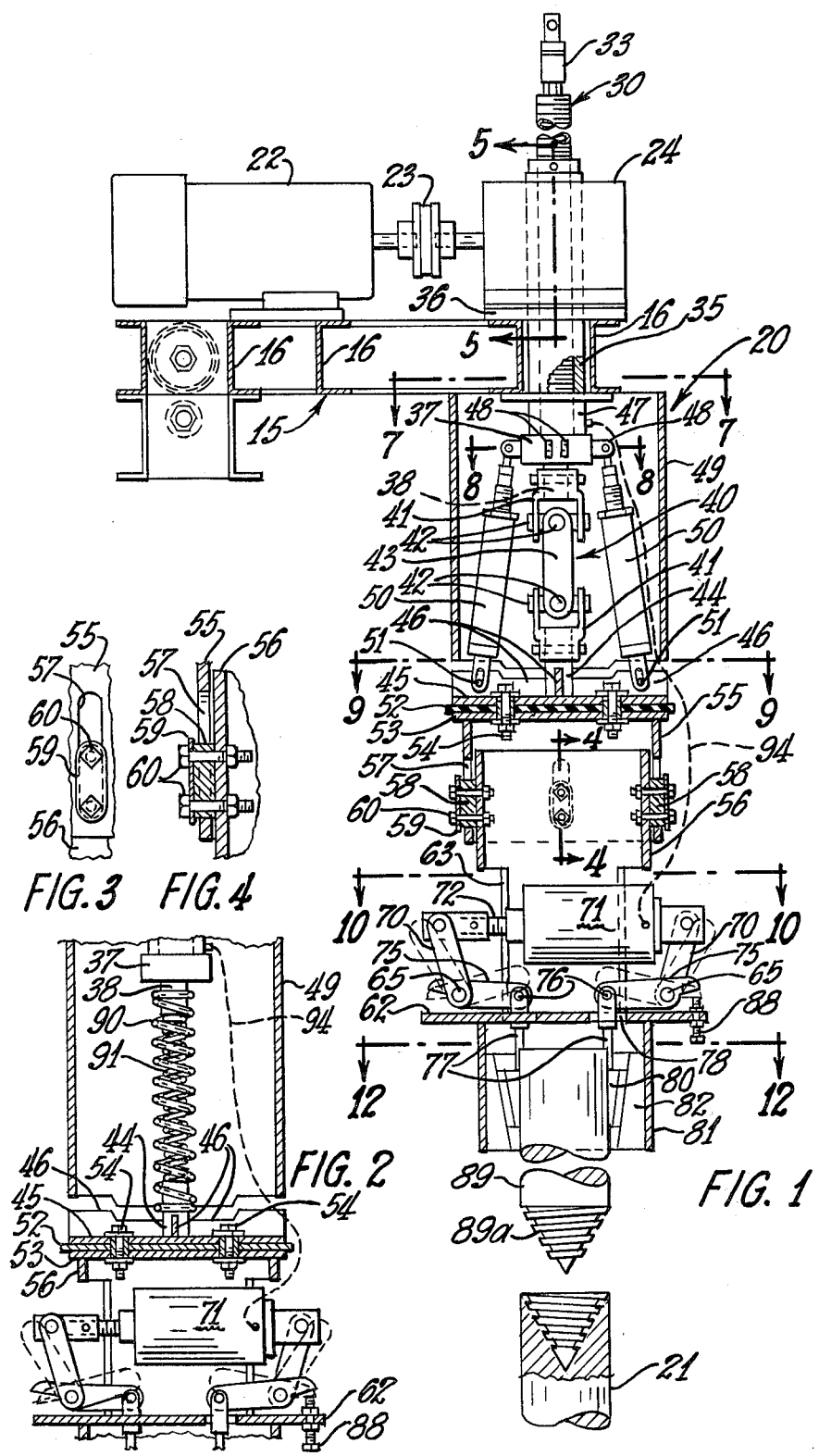

ELECTRODE REPLACEMENT APPARATUS

TECHNICAL FIELD

In the operation of arc furnaces, melters or smelters utilizing consumable electrodes, the electrodes generally are made of pre-baked carbon and are manufactured in discrete lengths which are spliced together by integral threads or by threaded nipples inserted into threaded recesses formed in the axial extremities of the cylindrical electrodes. As a working electrode is consumed, the next successive new replenishment or replacement electrode is threaded to the working electrode in axial alignment therewith. Preferably, the electrodes are oriented so that the lower, presently installed, working electrode has a threaded, internal recess at its upper end and the replenishment electrode is provided at its lower end with male threads adapted to matingly engage the threads of the lower electrode recess.

To perform the replacement function, the replacement electrode is suspended from an overhead support and is simultaneously lowered and rotated relative to the fixed working electrode until the two electrodes are firmly threaded together.

Difficulties have been encountered in the past in carrying out this replacement operation with existing electrode replacing mechanisms. For example, some means must be provided for performing the threading operation even though the two electrodes may not be precisely axially aligned, typically where the working electrode is tilted or cocked from a true vertical position.

Additionally, the electrodes are relatively fragile and the driving and lowering mechanism must peripherally engage the replacement electrode with a gentle, yet firm, grasp so that the electrode is neither ruptured nor dropped. Further, the working electrode is connected to a high voltage power source, and the replacement electrode carrying and rotating means must be electrically insulated from the working electrode to avoid endangering workmen in the vicinity of the furnace.

Finally, and most importantly, the electrodes of pre-baked carbon and/or the threaded nipples have precisely fitted threads which must closely mate in order to provide a uniform current flow during use. To secure the electrode sections, the replenishment electrode must be moved downwardly at exactly the helix angle of the screw threads, and this requires correlating the lowering rate and the rate of rotation of the replenishment electrode with the helix angle of the threads. Otherwise, the threads will bind or cock, and the replenishment operation will fail.

In the past, difficulties have been encountered in providing a mechanism capable of carrying out these critical functions, and a need exists in the art for a simple, reliable, safe means for replacing electrodes in arc furnaces or the like.

DISCLOSURE OF INVENTION

The present invention now provides a new and novel electrode replacing mechanism and method for use in electric arc furnaces, melters and smelters.

Generally, the present invention proposes the utilization of a screw as the means for concurrently rotating and lowering a replacement electrode during its threaded assembly to a lower electrode. The screw is driven by suitable power means, and the screw is connected to an electrode-engaging means through a drive train.

The drive train is capable of tolerating axial misalignment between the suspended replacement electrode and the lower electrode. Such misalignment is accommodated by either a novel universal joint-stabilizer assembly or by a novel double spring arrangement. The universal joint-stabilizer assembly includes a conventional double universal joint which directly connects the driving screw to the remainder of the drive train and a plurality of hydro-pneumatic stabilizers peripherally arranged around the double universal joint and connected to both the screw and the remainder of the drive train to prevent excess wobble in the universal joint. The double spring arrangement interposes a pair of relatively reversely wound helical springs between the screw and the remainder of the drive train, one of the springs driving the drive train as the screw is rotated in one direction and the other spring driving the drive train from the screw when the screw is rotated in the opposite direction. Either type of connection is capable of accommodating misalignment of the two electrodes.

In the preferred embodiment of the invention, the screw is axially displaced vertically at the pitch of the screw threads, and the screw thread pitch is greater than the pitch of the electrode threads. As a result, the replacement electrode is advanced axially at a rate faster than its threads can be threaded into the threads of the lower stationary electrode, and the drive train is capable of accommodating this over-travel of the replacement electrode. Specifically, where the universal joint connection is utilized, the drive train telescopes intermediate the universal joint and the replacement electrode to accommodate the over-travel. Where the double helical spring drive is utilized, the springs simply compress to accommodate the over-travel. By providing the over-travel of the replacement electrode relative to its threads, it is not necessary to exactly correlate the axial advancement speed of the replacement electrode with the pitch of the electrode screw threads and there is no danger of either binding or stripping the threads during the threading operation.

The replacement electrode is suspended from the drive train by the utilization of a novel, wedge connection. The periphery of the replacement electrode is engaged by a plurality of wedges or slips which have segmental inner cylindrical surfaces engaging spaced portions of the upper part of the replacement electrode and which have inclined exterior surfaces which mate with correspondingly inclined surfaces of a holder surrounding the wedges. The wedges are suspended from the drive train for independent movement and are urged downwardly to a locking position under the constant bias of compressive springs. Power elevating means for the wedges are provided to elevate the wedges against the pressure of the biasing springs to release the replacement electrode once it is installed.

Once installation is complete, the screw is merely reversed after the wedges are elevated by the power means, and the entire installation mechanism is retracted from the installed replacement electrode.

To electrically isolate the installation mechanism from the working electrode during the replacement operation, a massive electrical insulating plate is installed in the drive train.

BRIEF DESCRIPTION OF DRAWINGS

FIG. 1 is a side elevational view, with parts broken away and in section, of an electrode replacement apparatus of the present invention;

FIG. 2 is a fragmentary view similar to FIG. 1 illustrating a modified form of the apparatus of FIG. 1;

FIG. 3 is a fragmentary side elevational view on an enlarged scale of a portion of the apparatus of FIG. 1;

FIG. 4 is an enlarged sectional view taken along the plane 4—4 of FIG. 1;

BEST MODE FOR CARRYING OUT THE INVENTION

Figure 7:
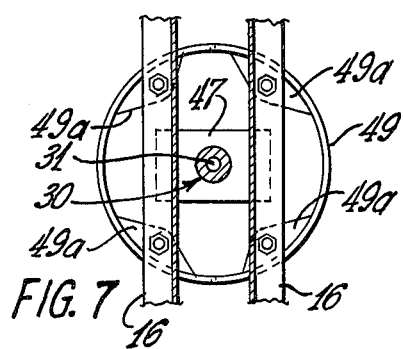
FIG. 7 is a sectional view taken along the plane 7—7 of FIG. 1.

As best shown in FIG. 1, the electrode replacement mechanism of the present invention is mounted on a carriage 15 having transverse support beams 16 and forming a part of an overall mechanism for positioning the electrode replacement mechanism 20 in substantially precise vertical alignment with a working electrode 21 installed at an arc furnace, melter or smelter. The carriage 15 is illustrated in detail and described in U.S. patent application Ser. No. 342,854, filed in the U.S. Patent and Trademark Office on even date herewith, and assigned to the assignee of the present invention. The electrode 21 is supported in its illustrated, fixed vertical position by any desired electrode support means, preferably that illustrated in U.S. patent application Ser. No. 342,870, filed in the U.S. Patent and Trademark Office on even date herewith and assigned to the assignee of the present invention. Reference is hereby made to these co-pending patent applications for the details of a suitable trolley mechanism 15 and a suitable support means for the electrode 21.

Figure 6:
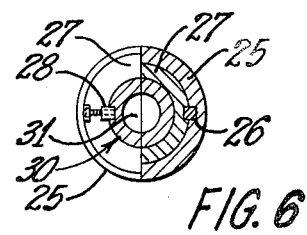
FIG. 6 is a sectional view taken along the plane 6—6 of FIG. 5.
Figure 9:
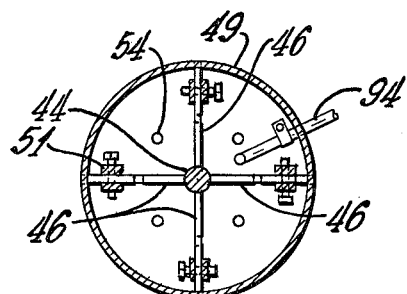
FIG. 9 is a sectional view taken along the plane 9—9 of FIG. 1.
Figure 5:
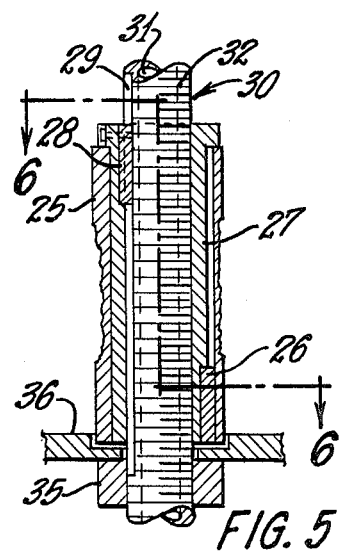
FIG. 5 is an enlarged fragmentary sectional view taken along the plane 5—5 of FIG. 1.
Figure 8:
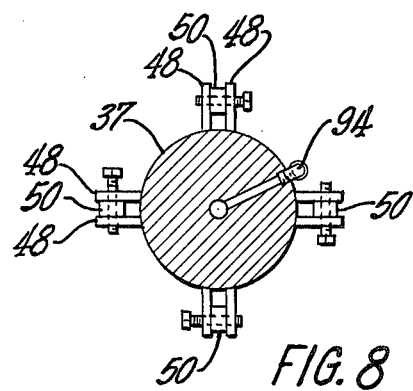
FIG. 8 is an enlarged sectional view taken along the plane 8—8 of FIG. 1.

The apparatus 20 of the present invention includes a reversible electric drive motor 22 superimposed on the carriage beams 16 and drivingly connected, as by coupling 23, to an angled drive unit 24. The angled drive unit 24 is well known in the prior art, a suitable drive being a cone drive reducer, Model 5HV7C-30:1 ratio, manufactured by Cone Drive, Inc. As best shown in FIG. 5, the angled drive 24 includes a driven hollow shaft 25 forming a part of the drive unit 24 and keyed, as at 26, to a coaxial vertical drive sleeve 27. The drive sleeve 27, in turn, rotates, through a key 28 sliding, in an axial slot 29, a vertically oriented screw 30 (see FIG. 6). The screw 30 is tubular having a hollow interior 31 and exterior threads 32. The interior 31 of the tubular screw 30 is connected, as through a known rotary coupling 33, to a source of air under pressure. As shown in FIG. 1, the screw 30 is threaded through a lower nut 35 which is secured to the undersurface of a supporting plate 36 fixed to the carriage 15. As the screw is rotated about its own vertical axis by the drive motor 22 and the drive unit 24, it is axially advanced by the nut 35 in either direction, depending upon the direction of actuation of the motor 22.

Welded to the bottom of the screw 30 is a collar 37 having a depending stub shaft 38 upon which is mounted a double universal joint 40. The double universal joint 40 is conventional design and includes upper and lower end clevises 41 joined through pivot pin 42 and a pair of axially extending links 43. The lower clevis 41 carries a stub shaft 44 secured to a mounting plate 45 by being welded to vertical ribs 46 integral with the plate 45 and lying normal to one another. The collar 37 abuts a stop 47 fixed to the carriage 15 and underlying the beams 16.

The collar 37 carries pairs of outwardly projecting brackets 48 between each of which is pivotally secured the upper end of a fluid pressure stabilizer 50. A plurality of such stabilizers 50 are provided, and each stabilizer has its lower end pivotally connected to the upstanding ribs 46 of the plate 45, as at 51. The stabilizers 50 may take the form of conventional hydro-pneumatic shock absorbers, and the stabilizers 50, by extending between the screw collar 57 and the plate 45 tend to prevent wobbling of the plate 50. It will be seen that four such stabilizers 50 are provided, although more or less may be utilized, if desired. The entire joint 40 and stabilizer 50 assembly is enclosed within a cylindrical housing 49 secured to the carriage beams 16, as by brackets 49a (FIG. 7).

The horizontal undersurface of the plate 45 is in contact with a sheet or plate 52 of electrical insulating material, such as Micarta or the like, and a lower plate 53 is provided to cooperate with the upper plate 45 in confining the insulating plate 52 therebetween. The plates 45, 52, 53 are retained in assembly by plurality of bolts 54 provided with insulating sleeves and washers, so that the lower plate is fully electrically insulated from the plate 45.

The lower plate 53 is welded to a depending cylindrical upper housing 55 which telescopically receives the upper end of a lower housing 56 which is also of cylindrical configuration. The outer housing 55 is provided with four vertically elongated slots 57 within each of which is positioned a slide block 58 and an enlarged slide plate 59 secured to the inner housing 56 by bolts 60, all as illustrated in detail in FIGS. 3 and 4. The slide block 58 and the slide plate 59 thus interconnect the outer housing 55 and the lower or inner housing 56 for relative vertical displacement, the extent of the displacement being limited by the vertical extent of the slots 57.

Figure 10:
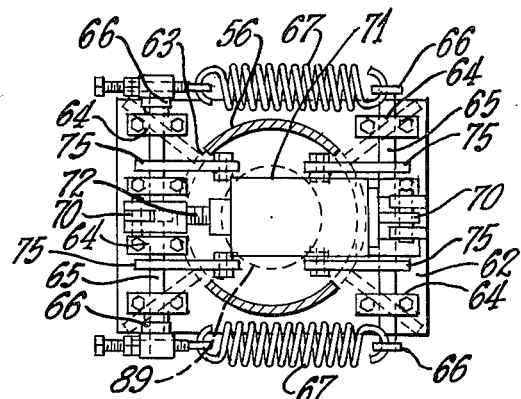
FIG. 10 is an enlarged sectional view taken along the plane 10—10 of FIG. 1.
Figure 11:
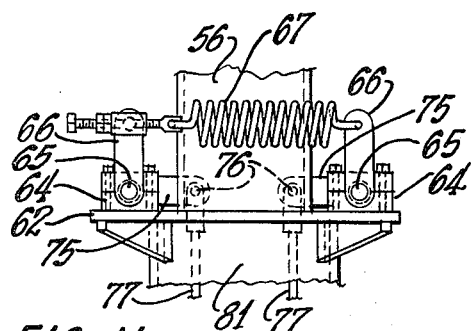
FIG. 11 is a fragmentary side elevational view of that portion of the apparatus shown in FIG. 10.

The lower housing 56 is secured at its lower end to a mounting plate 62, and the lower housing is apertured, as at 63, to provide a transverse slot. Superimposed upon the mounting plate 62, and secured thereto by split mounting blocks 64, are parallel pivot shafts 65, as best shown in FIGS. 10 and 11.

Located at the remote ends of each of the pivot shafts 65 is an upstanding link 66, and the opposing pair of links 65 are joined by tension springs 67. Tension adjusting screws are provided for adjusting the force of each spring 67. Fixed to medial portions of the shafts 65 are pivot links 70 having their upper ends joined by a transversely extending fluid pressure actuating cylinder 71, the actuating rod 72 of the cylinder 71 being joined to one link 70 and the cylinder itself being joined to the other link 70, as best shown in FIG. 1. Also secured to each of the actuating shafts 65 are a pair of actuating links 75 having their inner ends directed inwardly toward the center of the plate 62. The free inner ends of the actuating links 75 are pivotally connected, as at 76, to depending support rods 77 which project downwardly through apertures 78 formed in the plate 72.

Each of the depending rods 77 is pivoted at its lower end, as at 79, to an electrode-engaging wedge 80. Four such wedges 80 are provided and the four wedges require four depending rods 77 and four actuating links 75.

Figure 13:
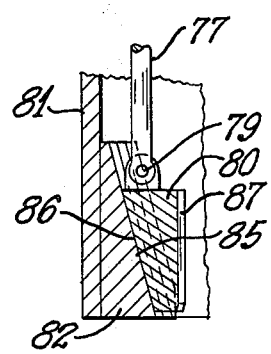
FIG. 13 is a partial sectional view taken along the plane 13—13 of FIG. 12.

Secured to the underside of the plate 62 is a depending cylindrical housing 81 which carries at its inner periphery a plurality of fixed segmental blocks 82. Four such segmental blocks 82 are provided, and each block has an inwardly opening recess 83. Each such recess 83 is defined by parallel sidewalls 84 which are vertical and by a rear wall 85 which is inclined downwardly and inwardly of the housing 81, as best illustrated in FIG. 13.

Figure 12:
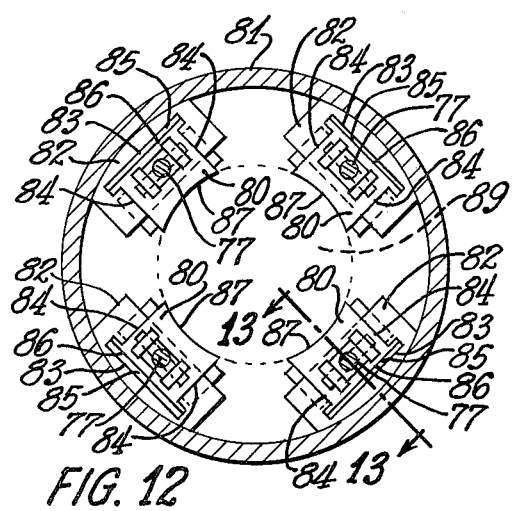
FIG. 12 is an enlarged sectional view along the plane 12—12 of FIG. 1.

Positioned within each recess is one of the wedges 80, each wedge 80 having an outer surface 86 which conforms in its downward and inward slope to the recess surface 85 and an inner surface 87 which is a segment of a cylinder, as best illustrated in FIG. 12.

It will be readily apparent that the wedges 80 are constantly urged downwardly by the tension springs 67 acting to turn the shafts 65 toward the vertical center line of the mechanism. The pneumatically actuated cylinder 71, when actuated to extend the cylinder rod 72 turns the shafts 65 away from the center line of the apparatus, thereby lifting the wedges 80 upwardly along the inclined surface 85 of the blocks 82. Upward movement of the wedges is limited by set screws 88 carried by the plate 62 to underlying the outboard end of the adjacent actuating arm 75 to limit the upward movement of the arms 75.

In that modified version of the apparatus of the present invention illustrated in FIG. 2 of the drawings, the universal joint 40 and the stabilizers 50 are eliminated and are replaced by a pair of oppositely wound, helical springs. An outer one of the springs 90 is wound in one direction, and the inner spring 91 is wound in the outer direction. Each of the springs 90, 91 has its upper end secured to the stub shaft 38 underlying the screw-carried block 37, and each of the springs 90, 91 has its lower end secured to the stub shaft 44 which is secured to the flanges 46 carried by the mounting plate 45. Additionally, it will be noted that the outer sleeve 55 of the embodiment of the invention shown in FIG. 1 is eliminated from that embodiment of the invention shown in FIG. 2, the inner cylindrical housing 56 being fixedly secured, as by welding, directly to the undersurface of the lower mounting plate 53.

In the operation of the device of FIGS. 1 through 13, the carriage 15 is initially displaced to a location where the electrodes 21 are stored, and an electrode is engaged by the wedges 80. The carriage is then moved into vertical alignment with the installed electrode 21, the apparatus at this time being in its condition illustrated in FIG. 1 of the drawings. To install the replenishment electrode 85, the reversible motor 20 is actuated to rotate the hollow shaft 25, the sleeve 27 and the screw 30 in a direction which, by engagement of the screw 30 with the nut 35, will drive the screw downwardly. The rate of displacement of the screw 30 downwardly is determined by the pitch of the screw threads. The screw 30 drives the universal joint 40 through the block 37, with the stabilizers 50 holding the plate 45 at the lower end of the universal joint 40 or at the lower ends of the springs 90, 91 from wobbling or from otherwise misaligning itself with the screw. The plates 45 and 51 displace the cylindrical housings 55, 56 and the replenishment electrode carried thereby downwardly toward the installed electrode 21. The wedges 80 are retained in engagement with the electrode 88 by the springs 67 displacing the links 66 toward the center line of the apparatus to locate the shafts 65, lowering the wedges 80 on the sloping surfaces 85 to urge the wedges peripherally invertly into contact with the upper extremity of the electrode 88.

An axial misalignment between the working electrode 21 and the replenishment electrode is accommodated by the universal joint 40 or the springs 90, 91.

The pitch of the screw 30 is greater than the pitch of the complementary threads 89 formed at the lower end of the replenishment electrode 88 and at the upper end of the installed electrode 81, respectively. As a result, the replenishment electrode 80 is driven downwardly faster than it can be threaded into the installed electrode 21. Upon contact between the threads 89, the rate of downward movement of the replenishment electrode 88 is governed by the pitch of the threads 89, so the replenishment electrode 88 is lowered at a rate slower than the rate of lowering of the remainder of the apparatus, including the wedges 80 and the drive train above the wedges. As a result, in the version of FIG. 1, the two housings 55, 56 telescope or move relatively in a vertical direction by virtue of the lost-motion connection provided by the slots 57 and the slide blocks 58. In the version of FIG. 2, the springs 90, 91 compress to yield the same lost-motion within the drive train. At the same time, the rotational motion of the replenishment electrode 88 threads the replenishment electrode 88 onto the fixed electrode 21.

By operating in this fashion, it is not necessary to exactly correlate the rate of axial lowering of the replenishment electrode 88 to the pitch of the threads 89, and any chipping or fracture of the threads 89 is avoided.

Once the electrode 88 is fully threaded into the fixed electrode 21, the cylinder 71 is actuated by air introduced through the coupling 33, the interior of the screw 30 and the air line schematically indicated at 94 to actuate the links 70 relatively outwardly, thereby rotating the shafts 65 and elevating the levers 75. The elevation of the levers 75 raise the wedges 80, so that the wedges move both upwardly and outwardly along the inclined surfaces 85. The rotational direction of the screw 30 is then reversed to elevate the screw and the remainder of the apparatus, thereby leaving the replenishment electrode 88 installed in full threaded engagement with the lower working electrode 21.

We claim:

1. In an electrode replacement apparatus wherein successive, vertically aligned electrode sections are inter-connected by relative rotation, each electrode section having complementary male and female threads at its respective ends, and the lower threaded end of a replacement electrode section being threadedly connected to the upper threaded end of the next lower electrode section, the improvements of a vertically oriented feed screw having its axis generally vertically aligned with the axis of said electrode;

means for both rotating said screw about said axis and axially displacing the screw vertically at the pitch of the screw threads, a drive train depending from said screw to be both co-rotatable and axially displaceable therewith;

an electrode-engaging means at the lower end of said drive train for securing a replacement electrode to the drive train for both vertical and rotational displacement with the screw;

the pitch of the screw thread being greater than the pitch of the electrode threads, such that the drive train is lowered by rotation of said screw at a rate faster than said replacement electrode is threaded into the working electrode, and means interposed in said drive train to accommodate relative vertical displacement of said electrode-engaging means and said screw to compensate for such faster lowering of said drive train.

2. In an apparatus as defined in claim 1, the further improvement of said drive train, including a universal joint driven by said screw to accommodate any misalignment between the axis of the screw and the axis of the working electrode and a lost-motion connection interposed between the joint and the electrode-engaging means to accommodate the relative displacement of said screw and said electrode-engaging means.

3. In an apparatus as defined in claim 1, the further improvement wherein said drive train includes a pair of axially nested, helical springs which are oppositely wound, one of said springs drivingly connecting said screw and said drive train in each direction of rotation of the screw, and said springs, in combination, both (1) accommodating any axial misalignment between the screw and the threads of the working electrode and (2) compressing to accommodate the relative vertical movement of the electrode engaging means and the screw.

4. In an apparatus as defined in claim 1, the improvement wherein said electrode-engaging means includes a plurality of wedges and means for independently actuating said wedges for vertical movement into and out of engagement with the periphery of the replacement electrode.

5. In an apparatus as defined in claim 4, the further improvement of said means for actuating said wedges including spring means urging said wedges into engagement with said replacement electrode, and power means for moving said wedges out of engagement with said electrode.

6. In an electrode replacement apparatus wherein successive, vertically aligned electrode sections are interconnected by relative rotation, each electrode section having complementary male and female threads at its respective ends, and the lower threaded end of a replacement electrode section being threadedly connected to the upper threaded end of the next lower electrode section, the improvement of electrode-engaging means and means for simultaneously rotating and lowering the electrode-engaging means, said electrode-engaging means comprising a plurality of electrode-engaging segmental wedges, each wedge having an inner segmented cylindrical surface for contacting a portion of the periphery of the electrode, and an outer inclined surface which is downwardly and inwardly inclined, slip-confining means encircling the slips and having interior inclined surfaces mating with the outer wedge surfaces to urge the wedges radially inwardly, and means for raising and lowering said wedges, the wedges (1) when lowered, engaging said electrode and (2) when raised, releasing said electrode, said last-mentioned means comprising spring means constantly biasing said wedges to their lowered, electrode-engaging portions and power means for raising said wedges against the constant bias of said spring means.

7. In an electrode replacement apparatus wherein a replacement electrode is connected to a working electrode connected to a source of current, the working electrode upper end and the replacement electrode lower end having complementary male and female threads, the improvements of replacement electrode-engaging means releasably secured to the upper end of the replacement electrode to suspend the replacement electrode in axial alignment with the working electrode, means for rotating the electrode-engaging means and for lowering the electrode-engaging means toward said working electrode, means for accommodating relative vertical movement between the electrode-engaging means and the rotating means, and a massive insulating plate fixed to the rotating means and electrically isolating the rotating means from the electrode-engaging means despite relative vertical movement therebetween, so that the replacement electrode may be threadedly connected to the working electrode without the interruption of current supply to the working electrode.

8. A method of replenishing a sectional working electrode as it is retained in a vertical operating position above an arc-type furnace, the steps of placing a replenishment electrode section in substantial vertical alignment with the working electrode; the adjacent, aligned, spaced ends of the electrode and said section having mating threads, respectively; rotating said replenishment section while lowering said section at a rate in excess of the axial movement of said section into threaded engagement with said electrode; and shifting said replenishment section relatively upwardly during its threaded engagement with said working electrode to compensate for the excess lowering rate of said section, such that the replenishment electrode section threads smoothly and without binding onto the working electrode.

9. A method of replenishing a sectional working electrode as it is retained in a vertical operating position projecting into an arc-type furnace by the addition of a replenishment electrode section, the working electrode and the replenishment electrode having interengageable threads at their adjacent ends; the steps of vertically suspending the replenishment electrode from an overhead drive screw having threads of a pitch greater than the pitch of the electrode threads, driving the screw to rotate the replacement electrode and to lower the replacement electrode at the rate of the drive screw threads, and relatively upwardly shifting the replacement electrode during threaded engagement of the electrode threads.

10. In an electrode replacement apparatus wherein successive, vertically aligned electrode sections are inter-connected by relative rotation, each electrode section having complementary male and female threads at its respective ends, and the lower threaded end of a replacement electrode section being threadedly connected to the upper threaded end of the next lower electrode section, the improvements of a vertically oriented feed screw having its axis generally vertically aligned with the axis of said electrode;

means for both rotating said screw about said axis and axially displacing the screw vertically at the pitch of the screw threads, a drive train depending from said screw to be both co-rotatable and axially displaceable therewith; and an electrode-engaging means at the lower end of said drive train for securing a replacement electrode to the drive train for both vertical and rotational displacement with the screw.

11. In an apparatus as defined in claim 10, the improvement wherein said electrode-engaging means includes a plurality of wedges and means for independently actuating said wedges for vertical movement into and out of engagement with the periphery of the replacement electrode.

12. In an apparatus as defined in claim 11, the further improvement of said means for actuating said wedges including spring means urging said wedges into engagement with said replacement electrode, and power means for moving said wedges out of engagement with said electrode.

13. A method of replenishing a sectional working electrode as it is retained in a vertical operating position above an arc-type furnace, the steps of aligning a replenishment electrode with the working electrode; the adjacent, aligned, spaced ends of the working electrode and said replenishment electrode section having mating threads, respectively; suspending the replenishment electrode from a screw which (1) rotates said replenishment electrode and simultaneously (2) lowers said section at a rate in excess of the axial movement of said electrodes into threaded engagement; and moving said replenishment electrode upwardly relative to the working electrode during its threaded engagement with said working electrode, such that the replenishment electrode threads smoothly and without binding onto the working electrode.

14. An apparatus for replenishing a sectional working electrode as it is retained in a vertical operating position projecting into an arc-type furnace by the addition of a replenishment electrode, the working electrode and the replenishment electrode having inter-engageable threads at their adjacent ends; said apparatus comprising means for suspending the replenishment electrode from an overhead drive screw having threads of a pitch greater than the pitch of the respective electrode threads, means for driving the screw to rotate the replenishment electrode while lowering the replenishment electrode at the rate of the drive screw threads, and means accommodating relative upward movement of the replacement electrode during threaded engagement of the electrode threads.

* * * * *